(12) United States Patent
Coppage

(10) Patent No.: US 9,655,298 B1
(45) Date of Patent: May 23, 2017

(54) GRANULAR MATERIAL DISTRIBUTION SYSTEM AND METHOD

(71) Applicant: Ross Coppage, Swansea, IL (US)

(72) Inventor: Ross Coppage, Swansea, IL (US)

(*) Notice: Subject to any disclaimer, the term of this patent is extended or adjusted under 35 U.S.C. 154(b) by 384 days.

(21) Appl. No.: 14/177,946

(22) Filed: Feb. 11, 2014

Related U.S. Application Data

(60) Provisional application No. 61/762,962, filed on Feb. 11, 2013.

(51) Int. Cl.
*A01C 7/02* (2006.01)
*A01C 15/02* (2006.01)
*B65D 83/06* (2006.01)
*E01H 10/00* (2006.01)

(52) U.S. Cl.
CPC .............. *A01C 15/02* (2013.01); *B65D 83/06* (2013.01); *E01H 10/007* (2013.01)

(58) Field of Classification Search
CPC ........ A01C 15/02; E01H 10/007; B65D 83/06
USPC ....... 239/687, 317, 473, 655, 664, 681, 683, 239/689; 222/317, 473
See application file for complete search history.

(56) References Cited

U.S. PATENT DOCUMENTS

| | | | | |
|---|---|---|---|---|
| 909,289 A | * | 1/1909 | Haley | A01C 7/02 111/92 |
| 1,793,197 A | * | 2/1931 | Speicher | A01C 15/02 239/102.1 |
| 5,339,994 A | * | 8/1994 | Nuila | A01C 15/02 111/95 |
| 5,471,939 A | * | 12/1995 | Chancey | A01O 5/02 111/107 |
| 6,092,746 A | * | 7/2000 | Dillon | A01C 7/02 239/142 |
| 6,659,027 B1 | * | 12/2003 | Garcia | A01C 7/02 111/95 |
| 2010/0327087 A1 | * | 12/2010 | Harris | A01C 7/02 239/653 |

* cited by examiner

*Primary Examiner* — Arthur O Hall
*Assistant Examiner* — Joel Zhou
(74) *Attorney, Agent, or Firm* — Christopher Pilling

(57) ABSTRACT

Systems and methods for dispersing granular material from a supply enable enhanced directional control and throwing distance. The present invention is utilizable with an integrated granular material supply container or can be configured for adaptation to a separate supply. Some embodiments of the present invention include a supply funnel, a flexible conduit, and a launcher constructed of a relatively stiffer material having a selectably openable aperture. When fed the supply of the granular material by the conduit, and moved forward in an underhanded tossing motion, a basic coordination of a triggering of the aperture opening at the appropriate moment in the toss controllably propels a substantial amount of the granular material a significant distance.

8 Claims, 3 Drawing Sheets

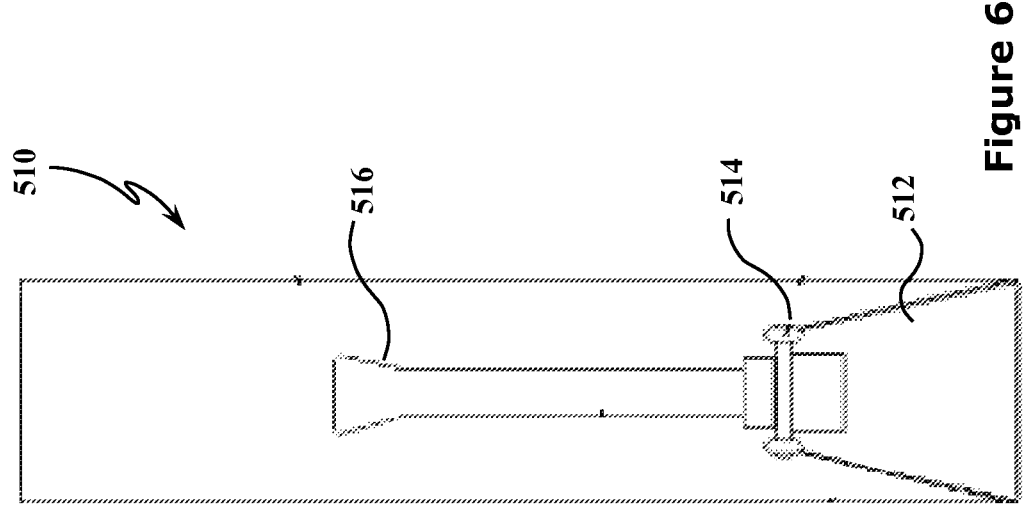
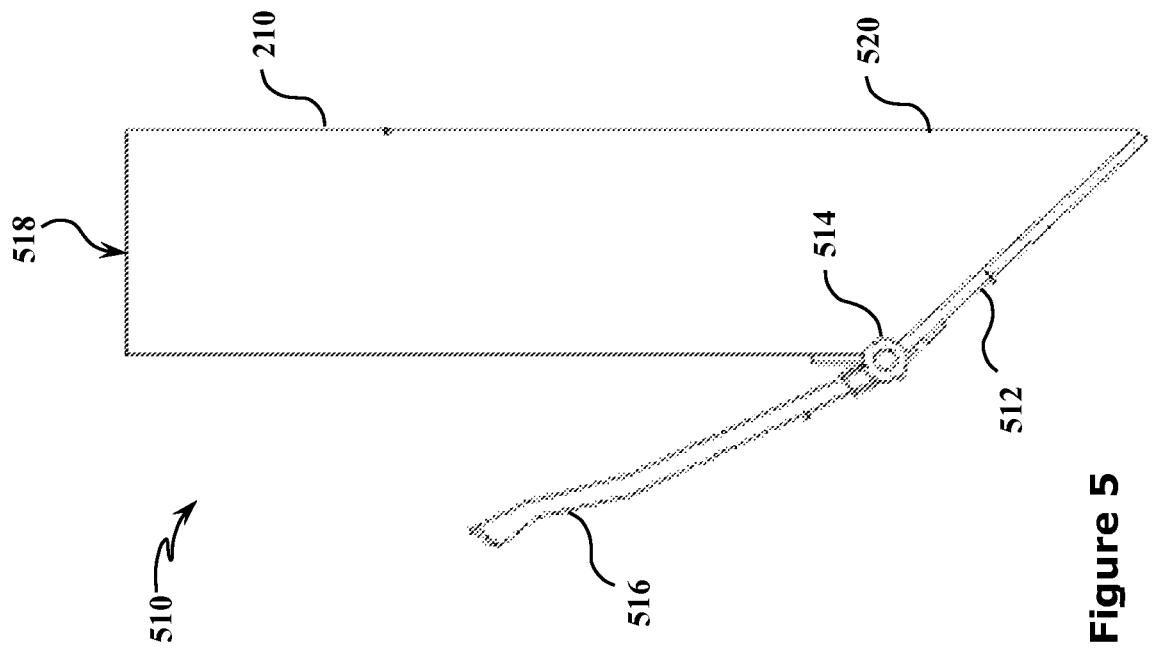

GRANULAR MATERIAL DISTRIBUTION SYSTEM AND METHOD

CROSS-REFERENCE TO RELATED APPLICATIONS

The present application claims priority to U.S. provisional patent application 61/762,962, filed Feb. 11, 2013, and is a U.S. non-provisional continuation thereof, and the entirety of the contents of U.S. provisional patent application 61/762,962, filed Feb. 11, 2013, are hereby incorporated by reference.

STATEMENT REGARDING FEDERALLY SPONSORED RESEARCH OR DEVELOPMENT

Not applicable.

BACKGROUND OF THE INVENTION

Field of the Invention

The present invention relates generally to systems and methods of distributing granular materials, and in particular to manually carried and operated granular material distributing with enhanced distribution and flow maintenance features.

Related Art

In many situations when the utilization of a granular material is required, the means of application of the granular product can be problematic. In these situations one frequently wants to distribute the material broadly, have a degree of control of the depth and spread of application, and be able to cover a substantial area with a minimum of difficulty. The ability to cover a substantial area is due to the nature of many of these granular materials, which include rock salt for deicing walk/driveways, fertilizer for aiding plant growth, plant seeds, and other forms of surface treatments. In certain circumstances, such as deicing walkways or scattering a water treatment across a pond, there are constraints on one's ability to easily and/or safely traverse the area being distributed across. Additionally, both for ease of application as well as increased speed, it is preferable to be able to propel the granular material a fair distance away from where one stands. While there are no shortage of differing mechanisms for accomplishing these tasks, such as salt spreading trucks and crop dusters, in many situations, such as deicing a home sidewalk or seeding a small lawn, it is only practical to use manual distribution.

While manually distributing the granular material is often the only pragmatic approach, it is also an approach that can present significant obstacles. Consider the likely most common situation in which a typical American homeowner would need to cover a substantial area with a granular material: namely deicing a frozen sidewalk or driveway with rock salt or a similar substitute. The difficulties involved can vary with every differing residence and particular weather conditions in effect, but one common issue is the need to walk on an icy path in order to be able to spread a deicer. A typical sidewalk or driveway will easily require covering an area that spreads at least 25 feet, and it is not likely that many healthy adult males will be able to accurately throw salt to cover an area from 0 to 25 feet evenly, accurately, and reliably, much less a 75 year old grandmother with a bad back. Accomplishing the deicing will almost always entail getting out upon an icy surface, while carrying a large container of the granular material. Hence, anybody would benefit from an easily utilized device which would help both in carting the material as well as facilitating its spreading, such as by enabling almost anyone to easily and reliably manually propel the granular material as far as 25 feet.

Additional features can also be beneficial in a granular material spreading device including an automatic charging capacity, wherein the device would keep the supply of granular material available for application without need for separate additional actions. Another related helpful capability would be for the device to preempt the formation of clumps of the granular material when it traverses the supply path. Also useful would be a capacity to adapt to a variety of differing types of granular material, as well as differing types of granular material supply containers, so that the device would have greater versatility. It would be preferable for the manner of use to be a relatively natural motion that would not require specific training or practice. Still further aid would be provided if the use of the device could involve ergonomically prudent practices, both in its manner of use and its manner of carrying it's supply of granular material.

SUMMARY OF THE INVENTION

Embodiments of the present invention provide combinations of capabilities that can address the above described issues. Among these embodiments' primary aspects are, variously, a hand-held launcher, a flexible feed line, a supply flow facilitator, and a supply container adaptor. The hand-held launcher can be configured in differing manners, with most configurations including a relatively inflexible hand piece that commonly extends to a length of a couple of hand widths, give or take. Also commonly included in the hand-held launcher are a trigger operated pivoting release lever and distribution shaping fins. The hand-held launcher is generally longitudinally hollow with an interior passage that will allow passage of the granular material. The granular material being distributed is launched from the distal end of the hand-held launcher, which incorporates a releasing aperture that is selectively openable by manually triggering the pivoting release lever to pivot to an open disposition from its normally closed disposition which is often produced by a spring bias (not shown). The length of the hand-held launcher is chosen so that it is long enough to provide additional impetus when swung, but not so long as to provide difficulties in aiming or issues for those of limited strength, since in operation about a half of the the hand-held launcher is generally held at one end with a similar length that terminates in the distal end extending beyond the hand. The hand-held launcher can assume a variety of shapes and cross-sections, and it is often beneficial for it to incorporate a hand-grip accommodation to ease its use, which usually also involves positioning the trigger in relation to the hand grip to further facilitate its ease of use.

Differing embodiments variously include the pivoting of the release lever along the upper side or along the lower side of the hand-held launcher. It is also quite possible, and within the scope of the present invention, for the release lever to be configured along the side of the hand-held launcher, though in many cases a top or bottom disposition is preferable. The manner of use normally involves swinging one's hand forward while holding the hand-held launcher, and hence the granular material emanates from the lower internal surface of the hand-held launcher. When the trigger is dispositioned along the top of the hand-held launcher, the release lever is usually also on the top, and hence the lower internal surface is the non-pivoting body of the hand-held launcher. When the trigger is dispositioned along the bottom of the hand-held launcher, the release lever is usually also on the bottom, and hence the pivoting length of the release lever forms the lower internal surface. In either case, the launching of the granular material is principally shaped by the actions of the hand-held launcher's lower internal surface. This shaping capability is able to be further enhanced by the inclusion of directing fins projecting from the lower internal surface upward into the interior of the hand-held launcher such that the granular material passing through the hand-held launcher is at least partially directed by the directing fins. The directing fins are capable of selective variations including varying numbers, varying orientation angles, and varying positioning along the longitudinal length of the hand-held launcher, including dispositions wherein the directing fins project outward further than the end of the hand-held launcher.

The granular material is launched from the distal end of the hand-held launcher, while the supply of the granular material is fed into the proximal aperture of the hand-held launcher. The proximal aperture is a relatively basic opening that is in open communication with a relatively flexible feed hose, which will regularly also include a funnel arrangement that broadens where it interconnects with the granular material supply container. The flexible feed hose interconnects the hand-held launcher with a granular material supply container which is generally maintained at a height greater than the hand-held launcher, so that gravity will drive the granular material from the supply container through the flexible feed hose and into the hand-held launcher. Often, the granular material supply container will be borne by the user with a strap or backpack arrangement. The granular material supply container is capable of being integrated with an embodiment of the present invention, as a purpose built combination. Alternatively, the granular material supply container can be separable and are then interconnected with the germane embodiments of the present invention whose construction includes an adaptor which can mate with one or more types of granular material supply container.

Within the flexible feed hose is positioned a flexible cord that is attached at its distal end to a lower interior surface in the vicinity of the proximal end of the hand-held launcher, while the flexible cord's proximal end is attached to an interior surface of the funnel arrangement in the vicinity of the proximal end of the funnel. The cord acts as a feed flow maintainer by virtue of its capacity to move independently within the flexible feed hose, so that when the hand-held launcher is swung back and forth, repeatedly flexing and unflexing the flexible feed hose, the cord within the flexible feed hose is also pulled and relaxed. The actions of the cord prevents clumping of the supply of granular material that feeds the hand-held launcher, and enables the continuing supply of the granular material to be maintained without need for attention by the user. It is also within the scope of the present invention for various dimensional relationships of the parts described to be relatively varied, such that, for example, the length of the tapering distal end of the hand-held launcher can be extended to greater lengths than the hand grip portion, or can be shortened to a fraction of the length of the hand grip. Other examples include variations in the lengths of the flexible feed hose; in the forms of funnel end adaptor; in the lengths of the trigger, the pivoting release lever, the forms of pivoting releases, including the positioning and the number of pivot points; in the lengths, positioning, number, and detachability of the fins.

In use, the embodiments of the present invention usually involve a user carrying the granular material distribution system and an interrelated supply of the granular material, for example, as a backpack arrangement. The supply of granular material is positioned above and connected with the proximal end of the funnel that in turn receives the supply of the granular material. Throughout the embodiment's use the supply of granular material is forced by gravity through the flexible feed hose, in rough parallel with the cord, and is then communicated to the hand-held launcher. The hand-held launcher's proximal end is interrelated with the distal end of the flexible feed hose, so that the supply of the granular material is communicated to the hand-held launcher and provides a continuous feed of the granular material that charges the hand-held launcher, ready for spreading. The use holds the hand-held launcher and repeatedly swings it back and forth, triggering the pivoting release lever to open at the appropriate time to launch the granular material where desired. Short amounts of experimentation will allow the user to readily develop skill at controlling and propelling the granular material as desired.

Other objects and features will be in part apparent and in part pointed out hereinafter. The descriptions, drawings, embodiment specification details, and examples presented herein of the present invention are intended for illustrative purposes only, and should not be taken as limiting the scope of the present invention.

BRIEF DESCRIPTION OF THE DRAWINGS

FIG. 5 depicts a side view of a second embodiment of the hand-held launcher.

FIG. 6 depicts a top view of the second embodiment of the hand-held launcher.

DETAILED DESCRIPTION OF THE PREFERRED EMBODIMENTS

In the following description, identical numbers indicate identical elements. Where an element has been described in one Figure, and is unaltered in detail or relation in any other Figure, said element description applies to all Figures.

Figure 1:
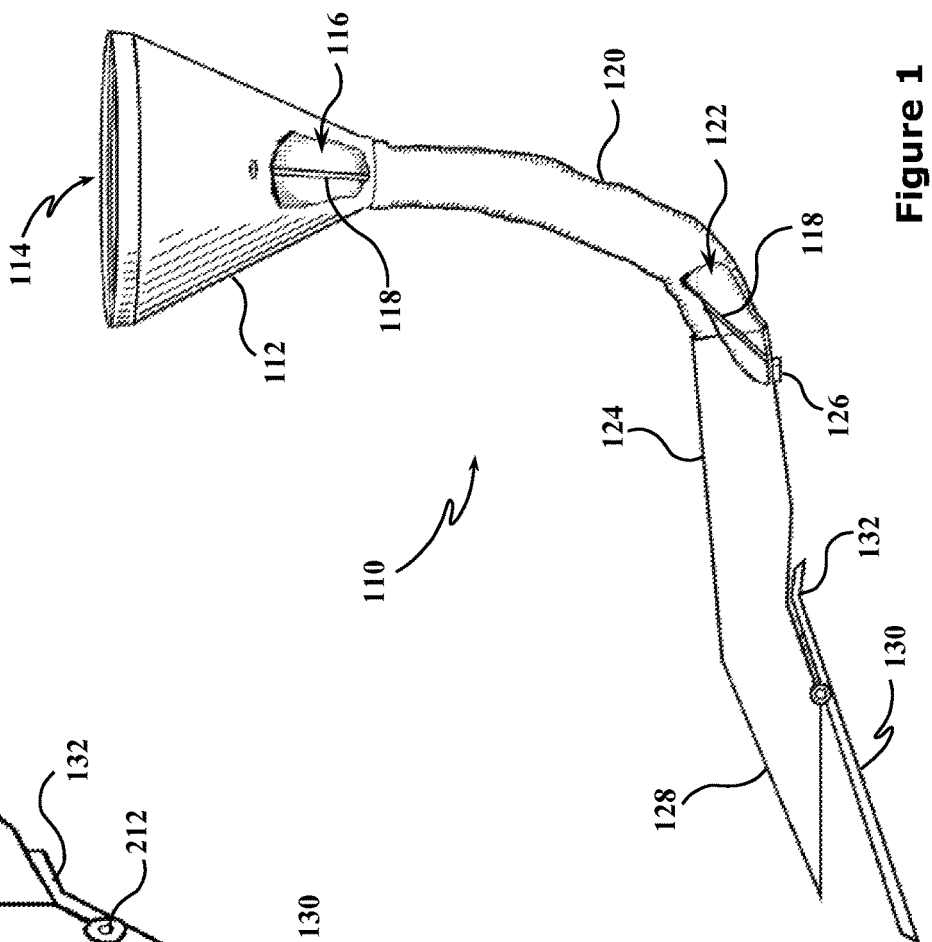
FIG. 1 depicts a perspective view facing the distal end of a first embodiment of the hand-held launcher, shown from an offset to the side of the hand-held launcher.

A first granular material distribution system embodiment 110 is shown in FIG. 1 from the side, with partial cutaways. The first embodiment 110 comprises a funnel 112 that receives the supply of granular material at its open proximal end 114, shown as a basic circular aperture in FIG. 1 but which can also assume essentially any needed shape, in differing embodiments, to provide adaptability to a variety of supply container forms. In some cases, (not shown) the supply container and the first embodiment 110 are integrated. A first cutout window 116 shows a cord 118 within the funnel 112 supply channel traversed by the granular material as it is communicated to the proximal end of the flexible feed hose 120. The cord 118 also traverses the flexible feed hose 120 in concert with the feed of the granular material supply. As seen in second cutout window 122 the distal end of the flexible feed hose 120 is interrelated with the proximal end of the first hand-held launcher 124, which is also the anchoring point 126 of the distal end of the cord 118. The interrelation between the flexible feed hose 120 and the first hand-held launcher 124 includes an open channel traversing their interiors through which a supply feed of the granular material passes under the impetus of gravity towards the distal end 128 of the first hand-held launcher 124. A releasing aperture is opened in the distal end of the first hand-held launcher 124 by movement of the first pivoting release lever 130 effected by the user depressing the first trigger 132.

Figure 2:
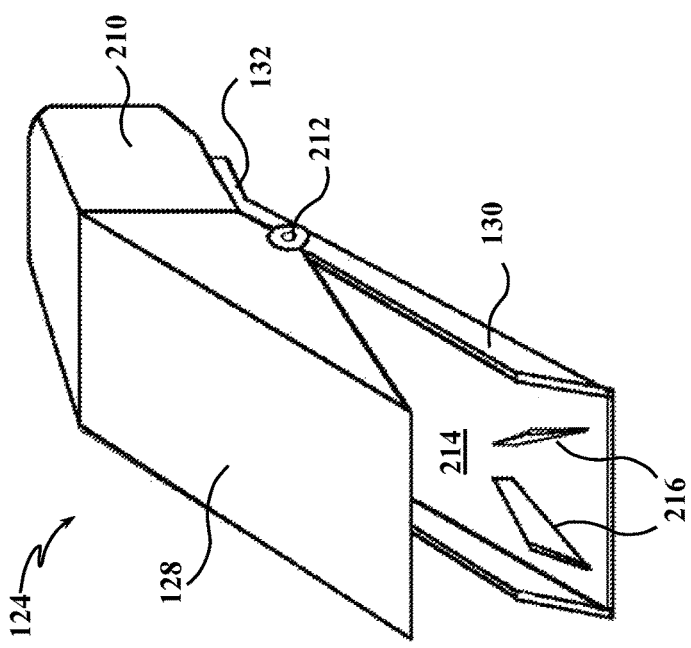
FIG. 2 depicts a side view, with partial cutaways, of a first embodiment of the granular material distribution system including embodiments of the hand-held launcher, the flexible feed hose and cord, and the funnel.

A detail perspective view of the distal end of the first hand-held launcher 124 is shown in FIG. 2. The first hand-held launcher is shown to have a differing profile in the vicinity of a hand grip portion 210 than in the vicinity of its distal end. The degree of shape variability possible in the hand grip portion 210 is somewhat limited, due to the need to provide a sufficiently large channel for the feed of granular material to traverse through. A first pivot 212 interconnects the stationary portion of the first hand-held launcher 124 and the first pivoting release lever 130. A lower interior surface 214 of the first hand-held launcher is formed by the first pivoting release lever 130, which also includes granular material directing fins 216.

Figure 4:
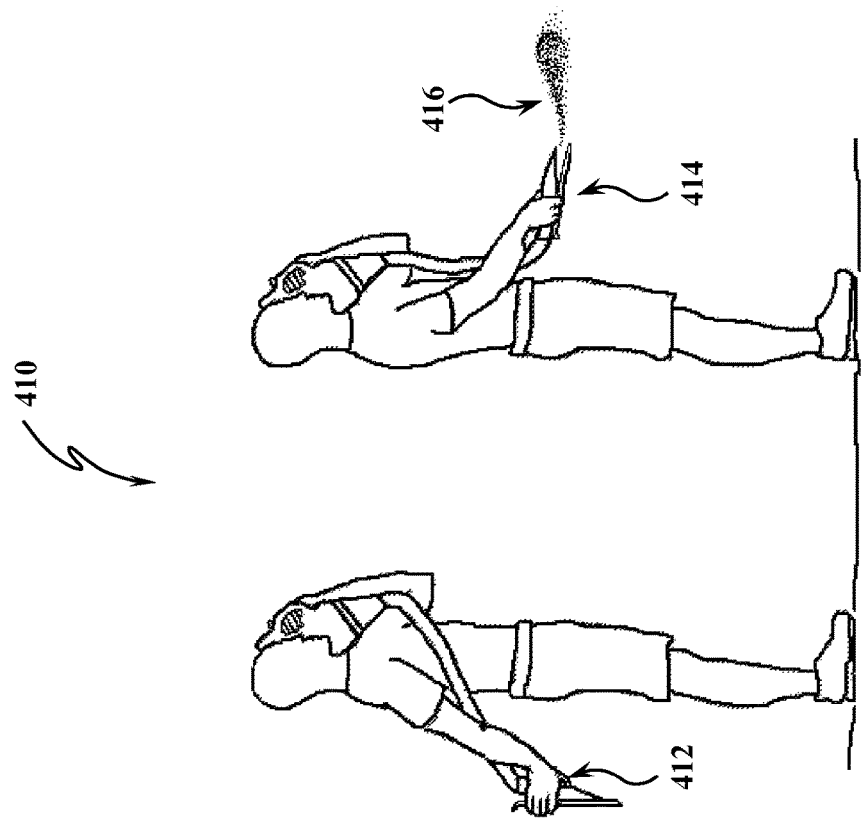
FIG. 4 depicts typical alternative positions assumed by a user when distributing a granular material with a representative embodiment of the present invention.
Figure 3:
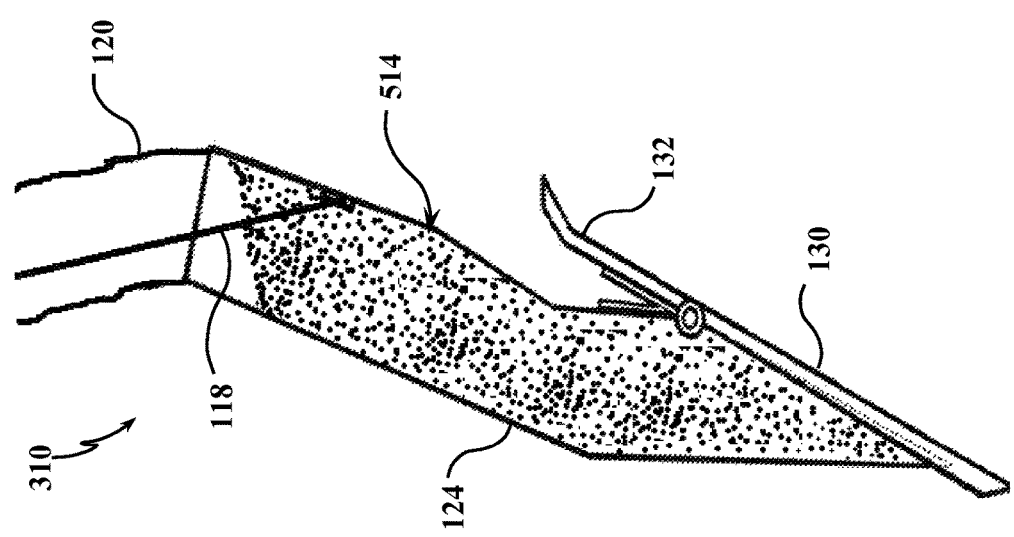
FIG. 3 depicts a cross section view of the first embodiment of the hand-held launcher, showing a supply of the granular material fed from the flexible feed hose, with the hand-held launcher in closed, downward pointing disposition.

A side cross-section view 310 of the first hand-held launcher 124 is shown charged 514 with a supply of the granular material to be distributed. The granular material fills the first hand-held launcher 124 by force of gravity when the first hand-held launcher 124 is held in a downward disposition, with the first pivoting release lever 130 biased in the closed disposition because the first trigger 132 is not depressed. The use of the first granular material distribution system 110 is shown in FIG. 4, which shows a user holding in his left arm a supply container of the granular material and in his right hand the first hand-held launcher 124. Usage will generally involve swinging the first hand-held launcher 124 backward to the approximate position 412, so that the first hand-held launcher 124 is pointing downward as shown in FIG. 3, so that it will be gravity fed with a charge of the granular material. The user then swings the right arm forward to the general position 414 and depresses the first trigger 132 to thereby release the granular material charge within the first hand-held launcher 124 and propel it as a launched discharge 416. The user will readily discover how to vary arm speed and length of movement, in coordination with the depressing of the first trigger 132, to provide the types and varieties of launched discharge 416 desired. Additional capabilities of controlling the launched discharge 416 are provided by modifications (not shown) in the set-up of the fins 216. They can be made detachable, such as by snaps, to simplify the launched discharge 416; they can even be extended beyond the distal end of the first hand-held launcher 124, as well as curved, to enhance the sideways spreading of the launched discharge 416. The fins 216 particular orientations can be made variable, by providing laterally traversing slots, for example, in the lower interior surface of the first hand-held launcher 124 which enable the directions of the fins 216 to be altered, either individually or as a group.

A second granular material distribution system embodiment 510, shown in a side view in FIG. 5 and in a top view in FIG. 6, essentially differs from the first embodiment 110 by substituting a second hand-held launcher 510 for the first hand-held launcher 124. The second hand-held launcher 510 differs from the first hand-held launcher 124 in that its second pivoting release lever 512 is hinged upon a second pivot 514 dispositioned along the upper surface of, and in the vicinity of the distal end of the second hand-held launcher 510. The second pivoting release lever 512 is opened by depressing a second trigger 516, usually with the user's thumb. The supply of the granular material to be distributed is fed by gravity again to charge the interior of the hand-held launcher 510 through the open proximal end 518. Another difference in the second hand-held launcher 510 from the first hand-held launcher 124 is that a lower interior surface 520 of the distal end of the hand-held launcher 510 is non-moving, as opposed to the pivoting release lever 130 that forms the lower interior surface of the distal end of the first hand-held launcher 124. In the second hand-held launcher 510, the fins 216 (not shown in FIGS. 5 & 6) would be attached to the non-moving lower interior surface 520.

In view of the above, it will be seen that the various objects and features of the invention are achieved and other advantageous results obtained. The examples contained herein are merely illustrative and are not intended in a limiting sense.

What is claimed is:

1. A granular material distribution system, comprising:
a receiver of a supply of granular material that channels and communicates the granular material to a flexible conduit that communicates the granular material to a launcher; said receiver, flexible conduit, and launcher defining a granular material passageway having an open cross-section of at least a first width throughout, said first width being generally at least large enough to accommodate several grains of the granular material;
said launcher having a relatively inflexible construction with a receiving end which accepts the granular material, a releasing end having an aperture from which the granular material is dispersed, and a longitudinal extent substantially longer than a hand width between the receiving and releasing ends; wherein said aperture provides an opening of at least sufficient size and configuration such that a significant fraction of the granular material within the launcher is controllably propellable and releasable when a moderate throwing motion is executed with the launcher;
a flexible cord is disposed within a substantial portion of the passageway, said cord being movable within the passageway separately from the motion of the passageway; and
a first end of the flexible cord is affixed to a backward side, when in use, of the receiver interior and a second end is affixed to a lower side, when executing a throw, of the launcher in the vicinity of the receiving end.

2. A granular material distribution system according to claim 1, wherein the aperture is selectably openable, and is normally biased to be closed.

3. A granular material distribution system according to claim 2, wherein the launcher incorporates a trigger mechanism that selectably opens the aperture from the closed position.

4. A granular material distribution system according to claim 1, wherein the launcher incorporates a trigger mechanism that when initiated, functions by pivoting open a release lever to establish the opening, said lever generally biased to a closed position.

5. A granular material distribution system according to claim 4, wherein a lower inner surface portion of the launcher in the vicinity of the releasing end is configured to provide a propelling surface for the granular material, when the launcher is moved through the throwing motion, and the propelling surface is formed from either the releasing lever or a static portion of the launcher.

6. A granular material distribution system according to claim 5, wherein the propelling surface extends back from the releasing end and includes directional vanes that are angled both only partially parallel to the granular material flow direction and transversely outward towards the releasing end.

7. A granular material dispenser, comprising:
- a granular material receiver that accepts a supply of granular material and funnels the granular material to a flexible feed hose,
- said hose maintaining a relatively consistently open passageway when swung between backward and forward dispositions, and feeding the granular material to a receiving end of a launcher,
- wherein each of the receiver, hose, and launcher maintains an open passageway for flow of the granular material transversely larger than the combined widths of several grains of the material,
- said launcher having a relatively inflexible construction with a receiving end which accepts the granular material, a releasing end having an aperture from which the granular material is
- dispersed, and a longitudinal extent substantially longer than a hand width between the receiving and releasing ends; wherein said aperture provides an opening of at least sufficient size and configuration such that a significant fraction of the granular material within the launcher is controllably propellable and releasable when a moderate throwing motion is executed with the launcher;
- said aperture is selectably openable, is normally biased to be closed, and is opened from the closed position by a trigger mechanism, said trigger functioning by pivoting open a release lever;
- a lower inner surface portion of the launcher in the vicinity of the releasing end is configured to provide a propelling surface for the granular material, when the launcher is moved through the throwing motion, and the propelling surface is formed from either the releasing lever or a static portion of the launcher; and
- the propelling surface extends back from the releasing end and includes directional vanes that are angled both only partially parallel to the granular material flow direction and transversely outward towards the releasing end.

8. A granular material dispenser according to claim 7, wherein a flexible cord is disposed within a substantial portion of the passageway, said cord being movable within the passageway separately from the motion of the passageway.

* * * * *